(12) United States Patent
Logue et al.

(10) Patent No.: US 7,599,976 B1
(45) Date of Patent: Oct. 6, 2009

(54) SYSTEM AND METHOD FOR CRYPTOGRAPHIC KEY GENERATION

(75) Inventors: Aaron Logue, Seattle, WA (US); Jess Roberts, Seattle, WA (US); Nikos Mouat, Seattle, WA (US)

(73) Assignee: Metrowerks Corporation, Austin, TX (US)

( * ) Notice: Subject to any disclaimer, the term of this patent is extended or adjusted under 35 U.S.C. 154(b) by 1263 days.

(21) Appl. No.: 10/295,002

(22) Filed: Nov. 13, 2002

(51) Int. Cl.
*G06F 1/02* (2006.01)
*H04L 9/00* (2006.01)

(52) U.S. Cl. ............... 708/250; 708/254; 380/46

(58) Field of Classification Search ......... 713/164–202; 365/185.04; 380/28–201; 717/124, 165, 717/114, 157; 711/103; 345/172; 708/250, 708/254
See application file for complete search history.

(56) References Cited

U.S. PATENT DOCUMENTS

| | | | |
|---|---|---|---|
| 4,467,139 A * | 8/1984 | Mollier ................. 713/181 |
| 5,258,748 A * | 11/1993 | Jones ................. 345/172 |
| 5,778,068 A * | 7/1998 | Johnson et al. ........... 713/189 |
| 6,374,354 B1 * | 4/2002 | Walmsley et al. ......... 713/167 |
| 6,378,072 B1 * | 4/2002 | Collins et al. ............. 713/187 |
| 6,587,916 B2 * | 7/2003 | Hongo et al. ............. 711/103 |
| 6,591,327 B1 * | 7/2003 | Briner et al. ............. 711/103 |
| 2002/0073316 A1 * | 6/2002 | Collins et al. ............. 713/174 |
| 2002/0176575 A1 * | 11/2002 | Qawami et al. ........... 380/201 |
| 2003/0005335 A1 * | 1/2003 | Watanabe ................. 713/202 |
| 2003/0018892 A1 * | 1/2003 | Tello ....................... 713/164 |
| 2003/0198082 A1 * | 10/2003 | Silverbrook et al. ... 365/185.04 |
| 2004/0005051 A1 * | 1/2004 | Wheeler et al. ........... 380/28 |
| 2005/0216760 A1 * | 9/2005 | Rabin et al. .............. 713/200 |
| 2007/0143623 A1 * | 6/2007 | Walmsley et al. ......... 713/176 |

* cited by examiner

*Primary Examiner*—Chuong D Ngo
(74) *Attorney, Agent, or Firm*—Andrews Kurth LLP

(57) ABSTRACT

A system and method for generating a random, unpredictable cryptographic security key by the use of a memory device, such as a flash RAM memory chip, internal to a computing device. The system and method of the present invention allows for the generation of a cryptographic security key without the need for additional hardware that is specifically configured to generate key codes. One embodiment of the invention involves a method comprising the steps of executing a function on a flash memory device; timing the completion of the function executed on the flash memory device, thereby generating a time value; and deriving the key code from the generated time value.

12 Claims, 6 Drawing Sheets

APPENDIX A

```
static void flash_amd16_erase(struct arena_t *a, unsigned long pos)
{
  unsigned volatile short *address;
  unsigned long fbase = a->address;
  unsigned long flags;
  unsigned short status;
  int i;

#ifdef CONFIG_CROSSPORT_MODELS
  unsigned short loopcount = 0;
endif if 0
      printk("%s(%d):flash_amd16_erase(a=%x,pos=%x)\n",
           __FILE__, __LINE__, (int) a, (int) pos);
endif if (pos >= a->length)
    return;

address = (unsigned volatile short *) (fbase + pos);

/* Mutex all access to FLASH memory */
  down(&spare_lock);
  save_flags(flags); cli();

#if defined(CONFIG_WATCHDOG)
  watchdog_disable();
#endif

/* Erase this sector */
  /* FIX: check which byte lane the value needs to be on */
  *((volatile unsigned short *) (fbase | (0x555 << 1))) = 0xaaaa;
```

FIGURE 3A

```
   *((volatile unsigned short *) (fbase | (0x2aa << 1))) = 0x5555;
   *((volatile unsigned short *) (fbase | (0x555 << 1))) = 0x8080;
   *((volatile unsigned short *) (fbase | (0x555 << 1))) = 0xaaaa;
   *((volatile unsigned short *) (fbase | (0x2aa << 1))) = 0x5555;
   *address = 0x3030;

for (i = 0; (i < FTIMEOUT); i++) {
     status = *address;
     if ((status & 0x0080) || (status & 0x0020))
       break;
#ifdef CONFIG_CROSSPORT_MODELS
     loopcount++;
#endif
   } if (*address != 0xffff) {
       printk("%s(%d): FLASH erase failed, address %p iteration=%d
status=%x\n",
        __FILE__, __LINE__, address, i, status);
       *((unsigned volatile short *) fbase) = 0xf0f0; /* Reset */
   } if defined(CONFIG_WATCHDOG)
   watchdog_enable();
endif restore_flags(flags);
   up(&spare_lock);

#ifdef CONFIG_CROSSPORT_MODELS
   add_flash_chip_randomness(loopcount);
#endif
}
```

FIGURE 3B

APPENDIX B

```
#ifdef CONFIG_CROSSPORT_MODELS
void add_flash_chip_randomness(unsigned short loopcount) {
    add_entropy_word(&random_state, loopcount);
    random_state.entropy_count+=  int_ln(loopcount  &  ((1 << 12) - 1));

/* Prevent overflow */
    if (random_state.entropy_count > POOLBITS) {
        random_state.entropy_count = POOLBITS;
    }
}
#endif
```

FIGURE 4

APPENDIX C

```c
void seed_rng(void) {
   int fd;
   int i;
      char * buffer;

fd = open("/dev/rom2", O_RDWR);
   if (fd >= 0) {
      for (i=0;i<16;i++) {
         /* Add another 12-16 bits of entropy to the pool */
         ioctl(fd, BMSERASE, 4096);
      }
      close(fd);
   } buffer = malloc(450);
   if (buffer) {
         fd = open("/dev/urandom", O_RDONLY);
      if (fd >= 0) {
            i = read(fd, buffer, 450);
            close(fd);
            RAND_seed(buffer, i);
      }
      free(buffer);
   }
   return;
```

FIGURE 5

SYSTEM AND METHOD FOR CRYPTOGRAPHIC KEY GENERATION

FIELD OF THE INVENTION

The present invention relates to cryptography, and more particularly to the generation of unique cryptographic keys using solid-state memory devices.

BACKGROUND OF THE INVENTION

As more and more information is moving into electronic form, encryption is becoming more common. One prior art method of encryption is public key encryption, an encryption scheme in which each computing device or person is assigned to a pair of keys, called the public key and the private key. Each person's public key is published while the private key is kept secret. As can be appreciated by one of ordinary skill in the art, public-key cryptography can be used for authentication (digital signatures) as well as for privacy (encryption). Messages are encrypted using the intended recipient's public key and can only be decrypted using the recipient's private key. Messages are signed using the sender's private key and can only be decrypted using the sender's public key. Other encryption schemes, such as symmetric key encryption also rely on the use of cryptographic keys (random bit sequence). By the use of cryptographic keys, two users or devices can make their messages to each other undecipherable by an eavesdropper, and successfully distinguish legitimate messages from modified ones by means of informationally secure mathematical authentication methods.

As can be appreciated by one of ordinary skill in the art, the generation of cryptographic keys should be unpredictable, truly random, and in some situations the keys should not be reused. As can be appreciated by one of ordinary skill in the art, there are many methods for generating security keys. In one existing practice, key codes are generated by measuring the typing speed and cadence (keystroke dynamics) of a person using a computing device. In such prior art systems, the typing speed and time between keystrokes are measured over an extended period of time. The measured values are then used to generate codes for a cryptographic key. While this technique is generally accepted in the industry as one method for generating a generally random key, this prior art method is not useful for stand-alone computing devices that are not operated by user.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A-3B are an excerpt of computer programming code associated with an embodiment of an erase command in accordance with an embodiment of a method for generating a cryptographic security key by the use of an internal memory device.

FIGS. 4 and 5 are excerpts of computer programming code associated with an embodiment of a routine to add additional random factors to an end count generated from an erase command in accordance with an embodiment of a method for generating a cryptographic security key by the use of an internal memory device.

DETAILED DESCRIPTION OF THE PREFERRED EMBODIMENT

The present invention provides a system and method for generating a random, unpredictable cryptographic security key by the use of a memory device, such as a flash RAM memory chip, internal to a computing device. The system and method of the present invention allows for the generation of a cryptographic security key without the need for additional hardware that is specifically configured to generate key codes. In addition, the system and method of the present invention allows for the generation of a cryptographic security key without the need for an external source of random entries, such as a user typing on a keyboard. The following summary of the present invention first provides an overview of one suitable computing environment in which the invention may be implemented. The summary then provides a general description of one embodiment of the present invention.

Figure 1:
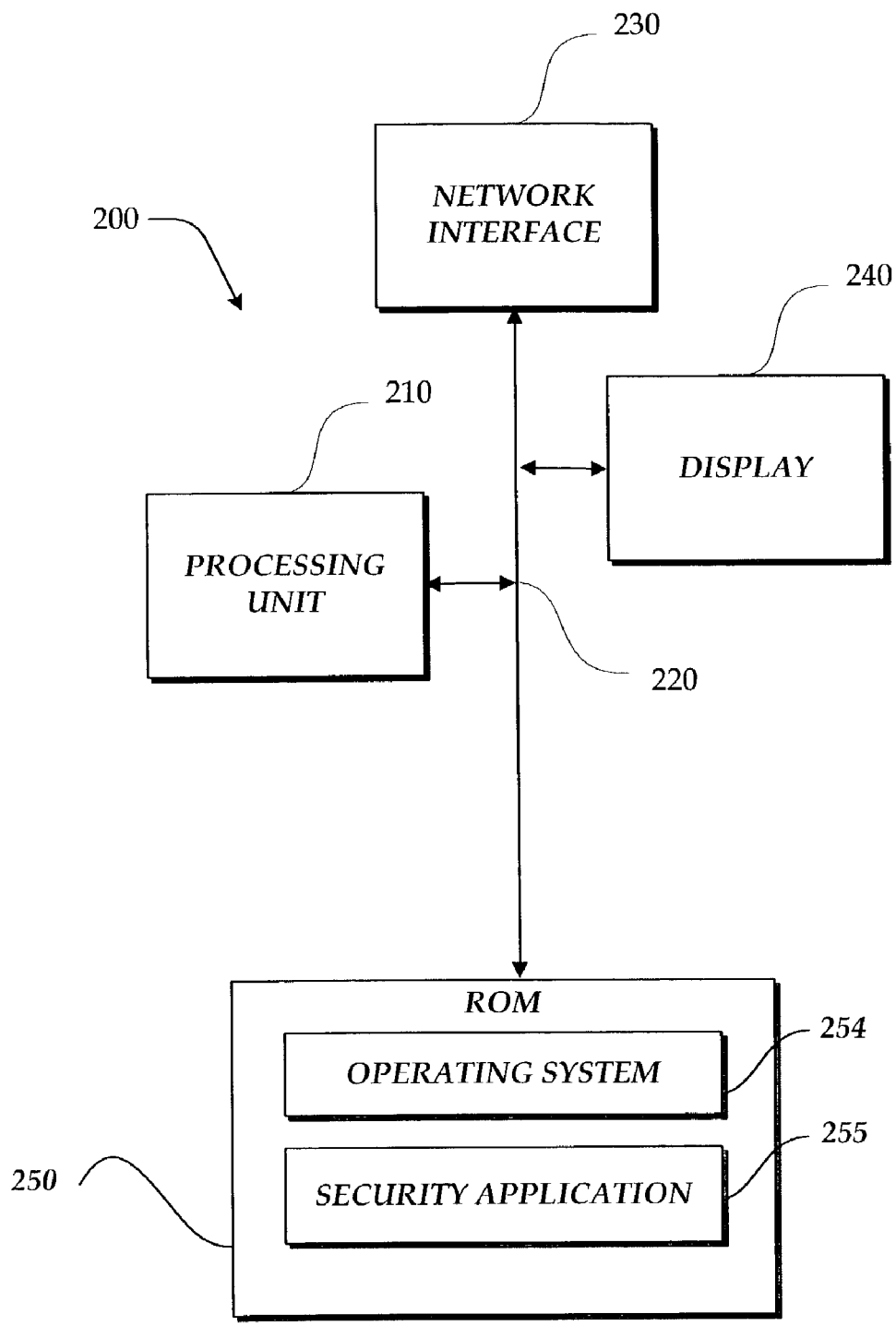
FIG. 1 is a block diagram of a computing environment in which the present invention functions according to one embodiment of the present invention.

Referring now to FIG. 1, an illustrative computing architecture for implementing the present invention will be described. The example computing device of FIG. 1 may be any general purpose computing device, such as a firewall, personal computer, server, or the like. Those of ordinary skill in the art will appreciate that the example computing devices may be a distributed computing device, such as a network of servers. In addition, the example computing device may be a any other communications device such as a two-way pager, mobile phone, personal data assistant ("PDA"), or any other computing device having network capabilities. Those of ordinary skill in the art will appreciate that the example computing device of FIG. 1 may include many more components than those shown and described below. However, it is not necessary that all of these generally conventional components be shown in order to disclose an illustrative embodiment for practicing the present invention.

As shown in FIG. 1, the computing devices utilized in the implementation of the present invention include a network interface 230 for electronic communication with a network, such as the Internet. The example computing device depicted in FIG. 1 also includes a processing unit 210 and memory 250. Optionally, the computing device may include an interface unit 240. If utilized, the interface unit 240 can be any device suitable for communicating information to a user, such as a screen, set of lights, or circuitry that enables a remote user login. The memory 250 generally comprises a random access memory ("RAM"), a read-only memory ("ROM"), and may include a permanent mass storage device, such as a hard drive. The memory 250 stores the program code necessary for operating the hardware components of the computing device, such as an operating system 251. The memory 250 may also store other software applications such as a network security application 255. As described in more detail below with reference to FIG. 2, the network security application 255 is configured to generate security key codes. Once generated, the key codes may be utilized by any software or security application. For instance, an application may generate a key in response to a network event. In other applications, the system and method of the present invention may periodically generate a new key code at a predetermined time interval.

In one embodiment, the memory 250 may be made from individual RAM and ROM devices or a combination of RAM and ROM memory devices. In one specific embodiment, the memory 250 may comprise a flash memory device such as the AM29LV160B flash memory chip manufactured by Advance Micro Devices, Inc. Although this illustrative example includes a particular flash memory device, the present invention may be used in conjunction with other similar memory devices. It can also be readily appreciated that the software components 254-255 may be loaded from a computer-readable medium into the memory 250 using a chip programmer or a drive mechanism associated with a computer-readable medium, such as a floppy, tape, CD-ROM, DVD, or a network interface.

As described above, the present invention provides a system and method for generating a cryptographic security key by the use of a standard memory device. In one embodiment, the system of the present invention executes a command to a memory device, measures the length of time needed to execute the command, and generates a code from the measured time. The generated code is then used by a random number generator for generating a cryptographic security key for a security application, such as an application using public key encryption.

Figure 2:
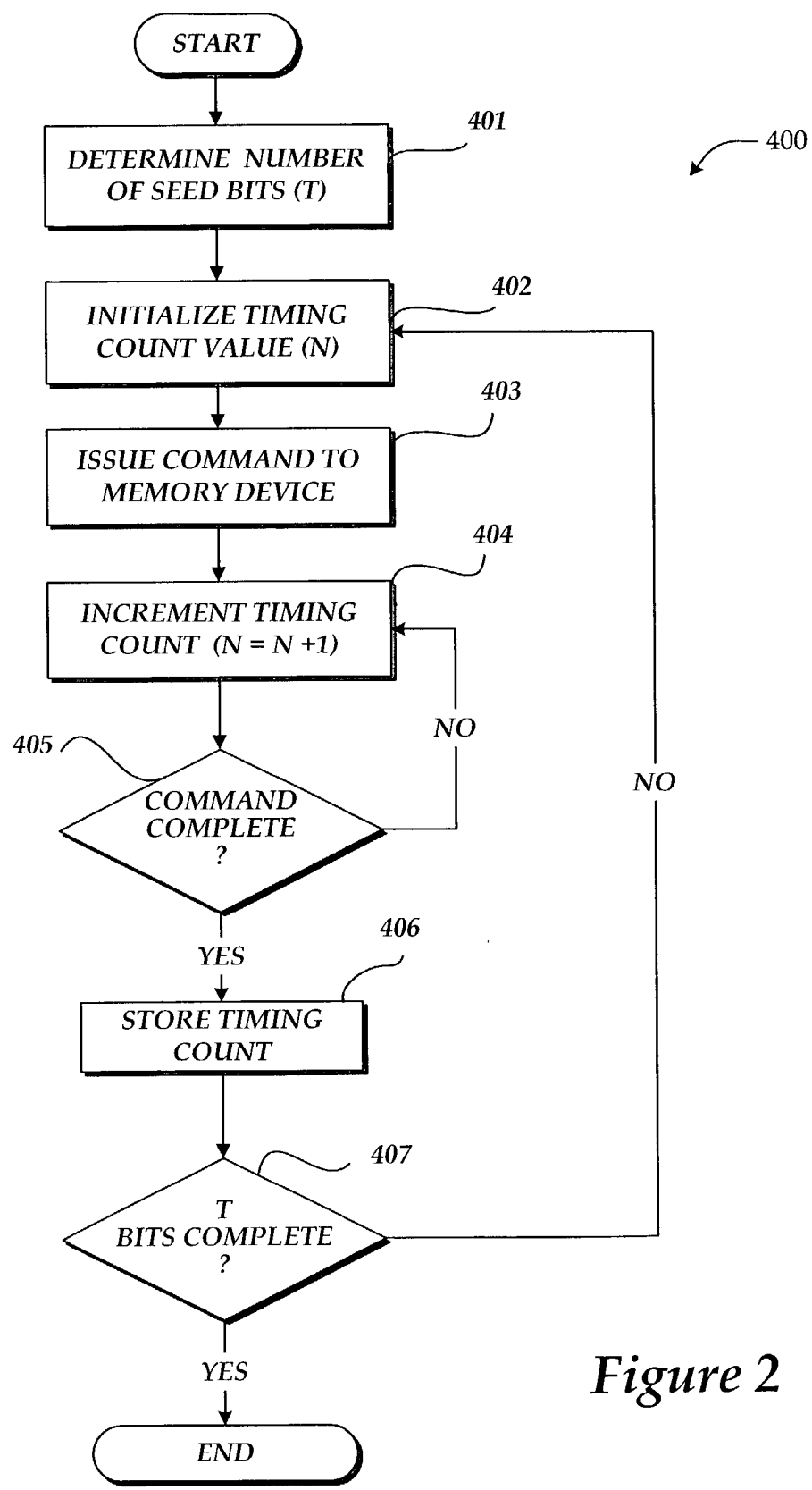
FIG. 2 is a flow diagram illustrating a method for generating a cryptographic security key by the use of an internal memory device.

Referring now to FIG. 2, a flow diagram of a method for generating a cryptographic security key is shown and described below. Generally described, the method generates a number of seed values, each of which are comprised of one or more unpredictable bits. The seed values are then passed to a random number generator to generate a security code. In view of the following summary of one embodiment, it will be appreciated that various changes can be made thereto without departing from the scope of the invention. Similarly, any process steps described herein might be interchangeable with other steps that achieve the same result. The illustrative examples described below are not intended to be exhaustive or to limit the invention to the precise forms disclosed.

The method begins at block 401, where an arbitrary number of seed bits (T) desired for the key code generation is chosen. In one embodiment, seed bits can be determined by receiving input from a user or external device. In other embodiments, seed bits may be a fixed value that is preprogrammed into the computing device, or they may be dynamically assigned by the computing device to accommodate different key code generation and encryption applications. Next, the method continues to block 402 where the computing device initializes a timing count value (N). In one embodiment, N is set to zero. As described below, the timing count value N is used to measure the duration of a command issued to a memory device, thereby producing a random value that is later used in a random number generator.

Next, as shown in block 403, the computing device issues a command to the memory device. In one embodiment, the memory device may be a flash memory chip, such as the 29LV160B flash memory chip manufactured by Advance Micro Devices, Inc. Although this embodiment shows one type of flash memory chip utilized to implement the present invention, other types of memory chip may be used. In one embodiment, the command issued to the memory device is a command to erase a block of memory in the flash RAM. For instance, the computing device may issue a command to erase a 4K block of memory in the memory device. As can be appreciated by one of ordinary skill in the art, in the embodiment involving the erase command, it is desirable to allocate an unused block of memory in the flash memory device so the erase command can be repeated without interfering with other software components stored in the memory device. As illustrated in the Advance Micro Devices specification sheet of the 29LV160B flash memory chip, the memory device is configured to execute a number of commands, any one of which can be utilized in the method of the present invention.

Appendix A illustrates the computer programming code associated with one specific embodiment of an erase command in accordance with the present invention. In this embodiment, a 16-bit variable is defined and initialized to zero. As shown in Appendix A, the 16-bit variable is incremented in a loop that determines if the flash chip is complete with a sector erase. When the erase command is complete, the routine sends the end count to another routine, such as the example shown in Appendix B, to add additional random factors to the end count generated from the erase command function of Appendix A. The sample code shown in Appendix A is a modified version of the uCLinux blkmem.c module, and the code shown in Appendix B is a modified version of the uCLinux random.c module.

After the computing device issues the command to the memory device, the method loops through process blocks 404 and 405 until the issued command is complete. As shown in FIG. 2, the process periodically increments N, at block 404, each time the computing determines that the issued command is not complete. However, at decision block 405, if the computing device determines that the memory device has completed the issued command, the method continues to block 406 where N is stored into the memory of the computing device. In one embodiment, the timing count (N) may be a value comprising 16 bits. Although a 16-bit value is used in this example, it can be appreciated by one of ordinary skill in the art that any number of bits can be utilized in this process. In one embodiment, a select bit, such as the least significant bit is stored in memory. In other embodiments, a number of select bits of the timing count (N) are stored in memory. In these alternative embodiments, any number of bits, such as two, three, four, or twelve bits, can be stored to execute this part of the process. The select bit(s) stored in this part of the process are used as the seed values, which are eventually passed to a random number generator.

Next, the process continues to decision block 407 where the computing device determines if the desired number of seed bits (T) has been generated. At decision block 407, if the computing device determines that the desired number of seed bits (T) has not been generated, the process continues back to block 402 where the computer generates another seed value by re-executing of process blocks 402-406. However, at decision block 407, if the computing device determines that the desired number of seed bits (T) has been generated, the process terminates.

Upon termination of this process of FIG. 2, the seed values are then passed to a random number generator, such as the "/dev/random" random number generator in the Linux system. In one example, T is equal to 192, and thus, sixteen seed values, each having twelve bits, are passed to the random number generator to create a valid security key. Appendix C illustrates the computer programming code associated with one specific embodiment in accordance with the present invention for generating an actual security key.

While several embodiments of the invention have been illustrated and described, it will be appreciated that various changes can be made therein without departing from the spirit and scope of the invention. Similarly, any process steps described herein might be interchangeable with other steps in order to achieve the same result. In addition, the illustrative examples described above are not intended to be exhaustive or to limit the invention to the precise forms disclosed.

The embodiments of the invention in which an exclusive property or privilege is claimed are defined as follows:

1. A method for generating a key code, wherein the method comprises:
    executing a function on a flash memory device;
    timing the function executed on the flash memory device, thereby generating a time value; and
    deriving the key code from the generated time value.

2. The method of claim 1, wherein the key code is derived by the use of a random number generator that utilizes the time value as a base number.

3. The method of claim 1, wherein the function executed on the flash memory device is an erase command.

4. The method of claim 1, further comprising the steps of:
    deriving a seed from the time value; and
    deriving the key code by the use of a random number generator utilizing the seed.

5. The method of claim 4, wherein the size of the seed is determined by user input.

6. The method of claim 4, wherein the size of the seed is determined by input from an external device.

7. The method of claim 4, wherein the size of the seed is a fixed value.

8. A method for generating a key code, wherein the method comprises:
    executing a function on a memory device;
    timing the function executed on the memory device, thereby generating a time value;
    deriving a seed from the generated time value; and
    deriving the key code by the use of a random number generator utilizing the seed.

9. The method of claim 8, wherein the memory device comprises flash memory.

10. The method of claim 8, wherein the memory device comprises random-access memory and read-only memory.

11. A system for generating a key code, comprising:
    a memory device;
    a computer device operative to time a function executed on the memory device, thereby generating a time value; and
    the computer device further operative to derive the key code from the generated time value.

12. The system of claim 11, wherein the memory device comprises flash memory.

* * * * *